June 2, 1959

B. R. SCHULTZ 2,889,442

DOMESTIC APPLIANCE

Filed Jan. 10, 1958

INVENTOR.
BLANCHE R. SCHULTZ
BY
Andrew G. Hubbard
ATTORNEY

June 2, 1959     B. R. SCHULTZ     2,889,442
DOMESTIC APPLIANCE
Filed Jan. 10, 1958     2 Sheets-Sheet 2
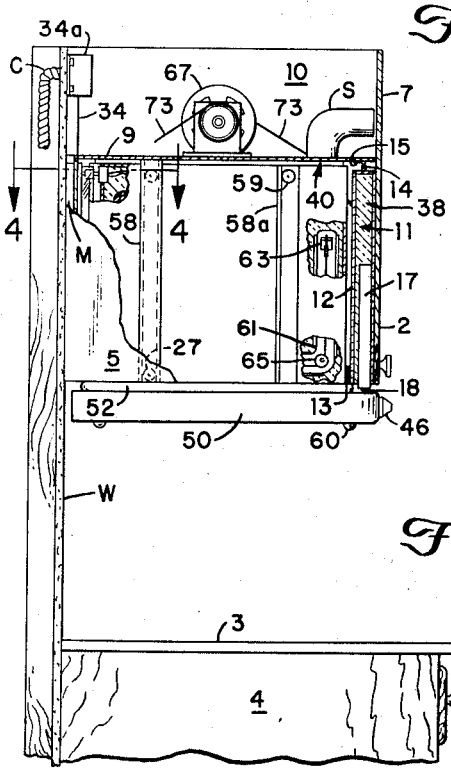
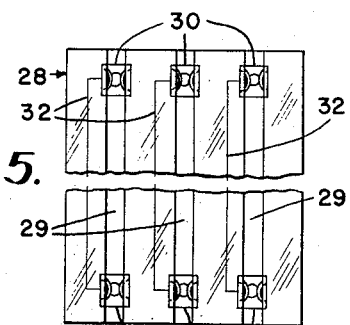
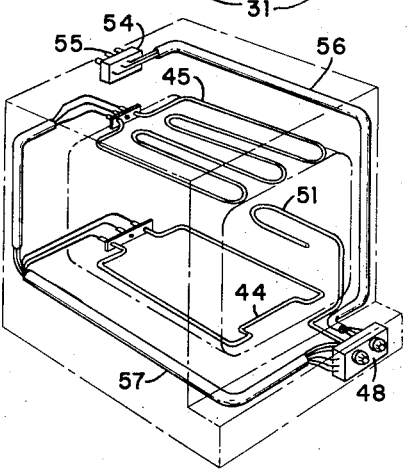
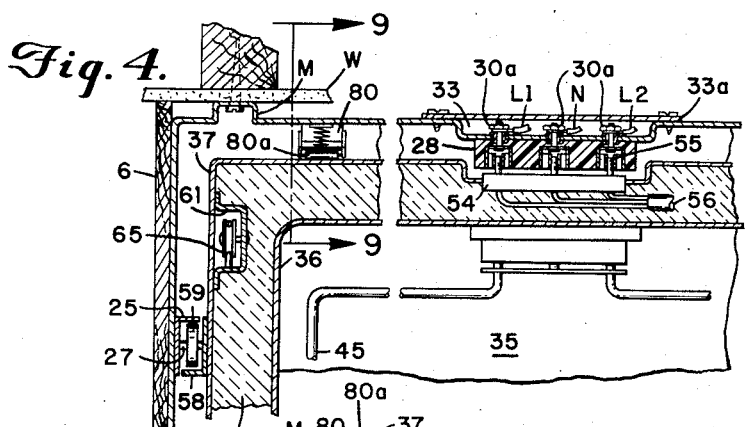
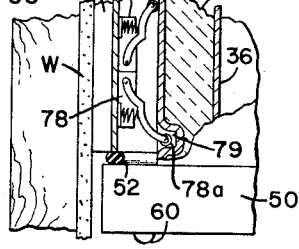
*INVENTOR.*
BLANCHE R. SCHULTZ
BY
*Andrew G. Hubbard*
ATTORNEY United States Patent Office 2,889,442
Patented June 2, 1959

2,889,442

DOMESTIC APPLIANCE

Blanche R. Schultz, Berwyn, Ill., assignor to General Electric Company, a corporation of New York Application January 10, 1958, Serial No. 708,153

6 Claims. (Cl. 219—35)

This invention relates to a domestic cooking oven, and particularly to an oven arranged for installation in an elevated cabinet such as a kitchen cabinet above a counter, said oven having elevating and control means permitting the use of the oven either in a concealed position within the cabinet, or in an exposed position immediately above the counter itself.

Raisable ovens known heretofore have been arranged for automatic movement between a storage position in an under-counter cavity and an operating position above the counter. This arrangement is objectionable in that the stored oven occupies a relatively large volume of the easily accessible under-counter storage space. A further disadvantage derives from the fact that during all cooking operations, the oven projects above the normal counter height, whereupon the raisable portion of the counter directly over the oven is obviously unavailable for use as a work surface. Still another disadvantage is evident when the oven is returned to the under-counter position after use. At this time there will of necessity be an open crack or groove between the fixed counter area and the raisable portion over the oven. While the width of this crack can be minimized by care in construction, it is almost inevitable that spillage from cooking preparations will escape down into the crack. Such spillage is objectionable for sanitary reasons and because of potential damage to the oven raising mechanism.

Accordingly, it is an object of my invention to provide an oven adapted for over-counter installation.

Another object of my invention is to provide a raisable oven construction in which the oven can be disposed above a counter providing a work surface that may be continuous and free from objectionable cracks or grooves.

Still another object of my invention is to provide a raisable oven construction in which the oven is disposed in an over-counter area releasing the easily accessible under-counter space for general storage.

A further object of my invention is to provide a construction in which an oven can be engaged in cooking operations while within a cabinet such as a cabinet mounted high on a wall of a kitchen and may be easily lowered from said cabinet for accessibility, whereby a counter or other work surface under the oven may be made free for use as a work surface during such cooking operations.

A still further object of my invention is to provide a raisable oven construction in which the raising mechanism and the electrical circuits and connections, although adequately protected, are readily accessible, facilitating installation and service of the mechanism.

A yet still further object of my invention is to provide an oven assembly which may be disposed within a simulated kitchen cabinet which is located above a counter or work surface in substantial spaced relation therewith, said oven assembly having means whereby the oven component may be elevated into said cabinet for storage and for cooking operations such as baking or roasting, and may be lowered from the cabinet for cleaning, loading, and such cooking operations as broiling.

In a presently preferred embodiment the objectives and advantages of the invention are attained by construction including an open-bottomed metal housing which is disposed within a structure simulating a wall-hung kitchen cabinet. The housing accommodates an oven which, except for the absence of the usual oven door, may be essentially of conventional construction. By means of guideways respectively mounted on adjacent side walls of the oven and the housing, and suitable motor-driven lifting mechanism located in an easily accessible chamber above the housing, the oven may be raised into the housing or lowered therefrom for complete exposure and accessibility.

It is a feature of the invention that an electrical system within the housing makes it possible to conduct cooking operations with the oven in either the raised or the lowered position; and further to effectuate this versatility, a front panel of the housing is arranged to provide an insulated front closure of the oven so that baking or roasting may be done while the oven is in its raised position, and a glass or similar guard or cover is made readily available to provide a suitable guard panel when broiling operations are conducted while the oven is in its fully exposed position.

The subject matter which I regard as my invention is particularly pointed out and distinctly claimed in the concluding portion of this specification. My invention, however, both as to organization and method of operation, together with further objects and advantages thereof, may best be understood by reference to the following description taken in connection with the accompanying drawing in which:

Fig. 3 is a side elevation of the structure of Fig. 1 showing the oven in the "up" position, the structure being partially broken away and partially in section in order to show details;

Fig. 4 is a partial horizontal section taken along the line 4—4 of Fig. 3;

Fig. 5 is an enlarged front elevation of the electrical supply runway of Fig. 1;

Fig. 6 is a phantom perspective view of the oven of Fig. 1 illustrating the physical relationship of the oven's electrical components;

Fig. 9 is a fragmentary rear sectional elevation of the structure of Fig. 3, partially broken away in order to show limit switch mounting details.

Figure 1:
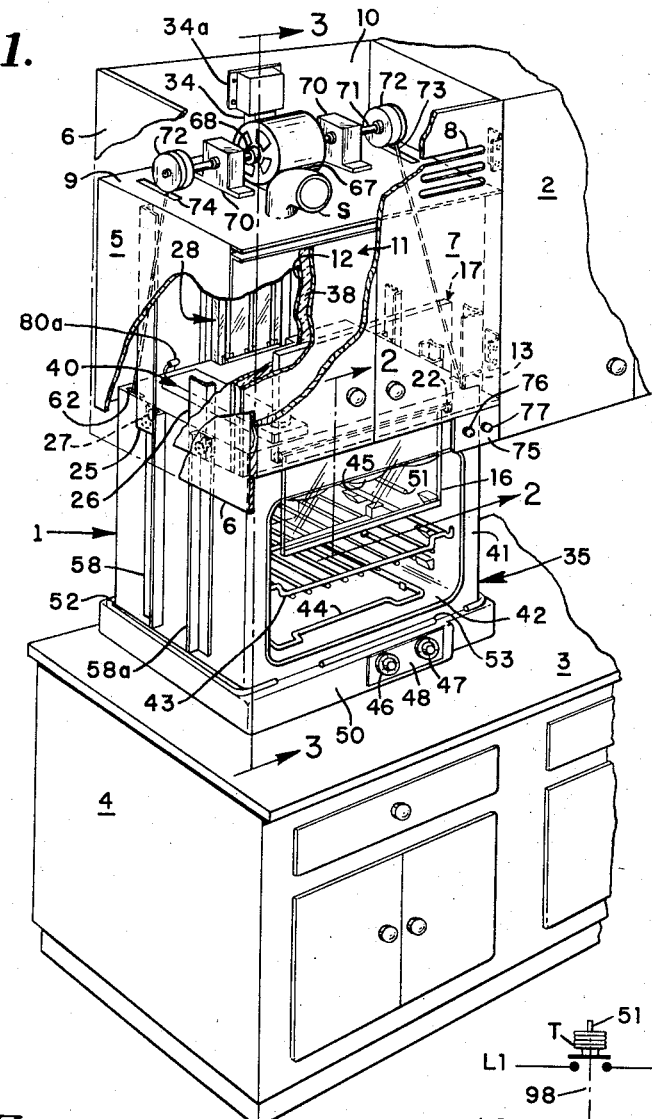
Figure 1 is a perspective view of a kitchen counter and cabinet arrangement including my raisable oven invention, the oven being shown in the "down" position, resting on the counter. Certain portions of the structure are broken away in order to show details.

Referring now to the drawings and particularly to Fig. 1, an oven assembly 1 is shown as installed in a line of kitchen cabinets 2 mounted to a wall W, the cabinets being spaced at the customary height for working convenience above a kitchen counter 3. The counter 3 forming no part of this invention, may be fabricated out of any suitable counter material. It provides a kitchen work surface, comprising the top of the usual kitchen base cabinets 4. The cabinets, which are of conventional construction may be of wood, enamelled steel, or any other suitable material. One of the upper cabinets is arranged to contain a metal oven housing 5. The side wall 6 of the cabinet, and the hinged cabinet doors 7, are conventional except for the vents 8 in the upper portion of the doors.

Figure 2:
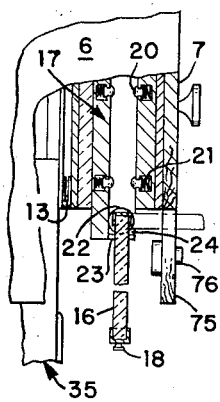
Fig. 2 is an enlarged sectional view of a portion of the oven housing of Fig. 1 showing details of the broiler shield mounting, the view being taken along the line 2—2 of Fig. 1.

The oven housing 5 is, generally speaking, of an open bottom, box construction. Its rear wall is provided with a pair of projecting mounting channels M to facilitate mounting the housing to the wall W. The upper wall 9 of the housing 5 is sufficiently below the top of the cabinet to provide a compartment 10 for the oven elevating mechanism and electrical connection box, as later described. The wall 9 includes a vent stack S which has an outlet directly behind one of the cabinet door vents 8. The housing 5 is provided with an insulated metal front panel 11. The inner metal wall 12 of the panel is preferably surfaced for easy cleanability: for example, it may have a vitreous enamel coating. The lower edge of panel 11 is provided with a pair of hinges 13 which secure the panel to the housing. Panel 11 also includes a latch 14 on its upper edge which co-operates with a strike 15 on housing 5 to retain the panel in its operational position. After opening the doors 7, the latch 14 can be released and the panel pivoted downward about the hinges 13 exposing the inner side of the panel when necessary, as for cleaning. A heat resistant glass broiler shield 16 is slidably mounted within a substantially open-bottom shield housing 17 secured within the lower portion of the panel 11. The shield is provided with a knob 18 for sliding the shield downward through the bottom wall of the shield housing and returning it to the enclosed position. The shield may be guided within the housing 17 by any convenient method, as for example, by mounted metal balls 20 biased against the glass by coil springs 21. The shield is provided with enlarged end portions 22 on its upper edge which rest on housing ledges 23 in the "down" position of the shield. The ledges 23, which are provided to retain the upper edge of the shield 16 within its housing, extend horizontally from the shield housing back wall forward across the extreme side portions of the shield housing bottom opening. As shown in Fig. 2, the lower edge of the shield housing front wall terminates above the corresponding edge on the housing back wall. As a result, the front wall of shield housing 17 is provided with a horizontally extending gap 24. The lower edge of the shield housing front wall is mounted relative to the ledges 23 so as to retain the enlarged ends 22 within the housing. As shown in Fig. 2, in the fully extended "down" position of shield 16, the shield can be swung upward through gap 24, about ends 22 to the position shown in dotted lines for cleaning purposes, the shield being retained within the housing by means of ends 22. The sides of the housing 5 are each provided with a pair of oppositely faced angle members forming tracks 25 and 26 on which are mounted rollers 27 (see Fig. 4). The inside of the rear wall of the housing 5 is provided with a centrally located, vertically extending, electrical supply runway 28.

The runway 28 consists of a suitable plastic electrical insulation block, which is provided with three vertically extending parallel slots 29. The upper and lower ends of the slots 29 are provided with the respective upper female terminals 30 and lower female terminals 31. As best shown in Fig. 5, the female terminals 30 and 31 for each of the individual slots 29 are electrically connected by means of jumpers 32 mounted in the insulation block in spaced relation to slots 29. The upper terminals 30 are electrically connected by means of binding posts 30a to power conductors L1, L2, and N of a conventional 118–236 v. Edison power circuit. The binding posts and power conductors are housed within a channel 33 having a removable cover plate 33a. At the top of the housing 5, the respective power conductors extend through a metal raceway 34 which communicates with a conventional connection box 34a disposed within compartment 10 for accessibility from without. The building power supply enters box 34a through flexible conduit C run within the building wall pursuant to standard electrical code practice. As terminals 30 are connected to terminals 31 by jumpers 32, both groups of terminals are energized at all times.

Figure 8:
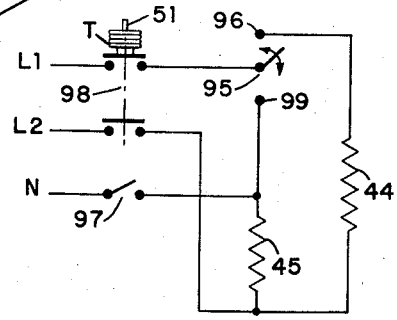
Fig. 8 is an electrical circuit diagram of the oven shown in Fig. 1.

An oven 35 is mounted within the housing 5. As shown in Fig. 4, the oven 35 includes an inner liner 36 and an outer wall 37 separated by a layer of heat insulation 38. The top wall of the oven includes an oven vent 40. As shown in Fig. 1, the oven is provided with a front wall 41 which has an access opening 42. The conventional interior of the oven 35 contains a rack 43, a removable bake heating unit 44, and a removable broiler heating unit 45, both heating units being of the sheathed electrical resistance type. The heating units are controlled through a conventional switch having a knob 46 and a conventional thermostat having a knob 47; each of said knobs is mounted on a control panel 48 which is secured to a shoulder portion 50 projecting from the lower edge of the oven. Within the oven is a thermostat capillary tube 51 comprising the temperature-sensitive element of a thermostat T (schematically shown in Fig. 8) mounted behind the control panel 48. The projecting shoulder portion 50 is provided with oven sealing gaskets 52, and 53, which extend almost completely around the lower edges of the oven. The gaps between the gaskets permit air to enter the oven, facilitating air circulation through the oven during cooking operations. At the top rear of the oven is an oven contact base 54 from which projects knife-shaped male contacts 55 which extend rearwardly into the slots 29 of the runway 28. Conduits 56 and 57, suitably supported within the insulated walls of the oven, respectively contain the conductors connecting the contacts 55 and the control devices, and the conductors connecting the control devices to the heating units 44 and 45, as later described.

The exterior sides of the oven are provided with pairs of oppositely faced, vertically extending angle members forming tracks 58 and 58a. Mounted to the tracks are rollers 59. The oven tracks 58 and 58a and rollers 59 are in vertical alignment respectively with the tracks 25 and 26 and the associated rollers 27 mounted on the housing. As best shown in Figs. 1 and 3, each roller is enclosed by and travels within a pair of co-operating tracks, one mounted on the housing and the other on the oven. This arrangement assures easy, jam-free vertical movement of the oven. The bottom of the oven may be provided with suitable feet 60, which may be of rubber, in order to cushion the oven as it reaches the "down" position on the counter.

A pair of U-shaped channels 61 (one fragmentarily shown in Fig. 3, are secured to the oven's outer wall between the wall and the heat insulation at each side of the oven. The rear leg of the left channel and front leg of the right channel, as viewed in Fig. 1, extend up to the top wall of the oven which is provided with openings 62 in registration with the open ends of the upwardly extending channel legs. As best shown in Fig. 3, within the channel 61, adjacent to the upper front portion of the left side wall of the oven and to the upper rear portion of the right side wall of the oven there are mounted brackets 63 which are suitably fastened to the inside of the channels 61. Three pulleys 65 are mounted to each of the channels 61, one pulley being mounted adjacent to each of the lower corners of the oven sides and one each to the upper rear and upper front corners of the left and right oven sides, respectively.

Mounted on the upper wall 9 of the housing 5 is a reversible electric motor 67 provided with a shaft 68 extending from each end of the motor. Any heat from the motor escapes to the atmosphere through the cabinet door vents 8. The ends of shaft 68 project into a pair of housings 70 containing suitable reducing gear trains (not shown). Extending from the housings are shafts 71 on which are mounted reels 72. Affixed to the reels 72 are steel wire cables 73. The cables extend downwardly from the reels through slots 74 in the wall 9, through the openings 62 in the top wall of the oven, into the open ends of the channels 61. Within the channels 61, the cables 73 are passed over the pulleys 65 and detachably mounted to the brackets 63 which are secured to the channels 61. In the "up" position and during vertical travel, the oven's weight is carried by the cables 73 which are fixed to the brackets 63 on the oven and to the reels 72. As the reels rotate, the cable winds or unwinds depending on the direction of reel rotation. It will be noted that the close proximity of the outlet of vent stack S to the cabinet door vents 8 insures that oven heat escapes to the atmosphere without effecting motor 67. It will be further noted that the oven raising mechanism on housing wall 9 is within reach and view when doors 7 are opened. This feature facilitates any servicing operations that may be required on the raising mechanism.

The preferred oven raising mechanism described herein is illustrative only and it will therefore be understood that my invention is not limited thereto but that any suitable raising mechanism, employing gears, chains, or other may be utilized.

While I prefer the oven raising mechanism form described in which no oven counterweights are employed, it will be understood that the oven may be counterbalanced if desirable in order to decrease the load on the motor.

Also, while I prefer the convenience of automatic raising of the oven, it will be understood that for economy reasons manual raising could be employed and still gain the advantages of my invention. For manual raising, the weight of the oven with anticipated load could advantageously be counterbalanced.

Reversible motor 67 is controlled by a triple-throw, double pole pushbutton switch 69 (shown schematically in Fig. 7) mounted to a switch receptacle 75 depending from the panel 12. The switch receptacle plate contains "up" and "down" switch pushbuttons 76 and 77. Suitable, normally open, "up" and "down" limit switches, respectively 78 and 80, are mounted on the inside of the back wall of housing 5. When the oven is in its up position (see Fig. 9) actuator 78a of switch 78 enters an opening 79 in the rear of the oven, whereupon switch 78 is open. Actuator 80a of switch 80 bears against the rear wall of the oven, closing the switch 80.

Figure 7:
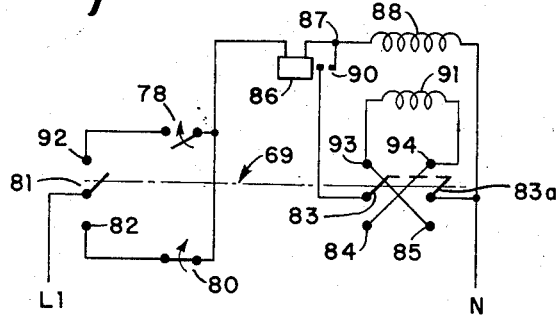
Fig. 7 is an electrical circuit diagram of the raising mechanism for the oven shown in Fig. 1.

Referring now to the mode of operation, loading of the oven for cooking takes place in the oven's "down" position at rest on the counter 3 as shown in Fig. 1. Assuming the oven is initially in the "up" position as shown in Fig. 3, "down" pushbutton 77 is pushed to actuate the descent of the oven. Referring now to Fig. 7, pushing "down" pushbutton 77 actuates switch 69 to close switch blade 81 against contact 82 and at the same time, to close switch blades 83 and 83a against the motor circuit contacts 84 and 85 respectively. As "down" limit switch 80 would normally be closed in the "up" position of the oven, there is then a closed circuit from L1 through switch blade 81, contact 82, limit switch 80, through a starting relay coil 86 to a terminal 87, and through motor run winding 88 to L2. As the motor is not running, the starting relay contacts 90 will be closed, so there is also a closed circuit energized from terminal 87 through contacts 90, switch blade 83, contact 84, contact 94, start winding 91, contact 93, contact 85 and switch blade 83a to N, energizing the motor. It will be understood that as the energized motor comes up to speed, the current through coil 86 will increase to a level where the starting relay contacts 90 will open, de-energizing the circuit to the starting windings. As the motor begins to rotate, the reels 72 will operate in an "unwinding" direction. The oven will then travel downwardly as the cable leaves the reels. As the oven travels downwardly, its passage will be guided by the co-operating tracks and rollers on the housing and oven. Concurrently, the oven contacts 55 will slide in the insulated runway slots 29 out of contact with the energized terminals at the ends of the runway. When the oven reaches the counter, actuator 80a of "down" limit switch 80 will no longer be pressed by the oven wall (see Fig. 1) whereupon switch 80 will open, de-energizing the motor circuit. The oven will then be in the position shown in Fig. 1 in which the oven access opening 42 is exposed for loading. In this position, switch 78 is in closed circuit condition. After the oven is loaded, assuming that the operator wishes to carry out a baking operation, the oven is raised to the "up" position. I prefer to carry out baking operations with the oven raised to the "up" position, because the counter space under the oven can then be used for other purposes. Raising the oven to the "up" position is actuated by depressing pushbutton 76 which closes switch blade 81 against "up" contact 92. Concurrently, switch blades 83 and 83a engage motor contacts 93 and 94. We then have a circuit from L1 through switch 81, "up" contact 92, "up" limit switch 78, coil 86, terminal 87, and motor run winding 88, to N. As the motor is at rest, the starting relay contacts 90 are closed so there is also a circuit from terminal 87, through contacts 90, switch 83, contact 93, run winding 91, contact 94, and switch 83, to N. However, it will be noted that when the "up" pushbutton switch is pressed, the motor starting winding current flows in the opposite direction from that taken when the "down" pushbutton is pressed, reversing the motor rotation direction. Consequently, the cables 73 will wind on the reels, raising the oven. The oven will then travel upwardly until limit switch 78 opens, breaking the circuit and stopping the upward travel of the oven. It will be noted that in the "up" position, the oven's access opening 42 is closed by insulated panel 11 resulting in a fully insulated cooking enclosure. Also, the oven contacts 55 will be in engagement with energized terminals 30 of runway 28.

The oven is operated for baking and broiling by setting switch knob 46 and thermostat knob 47 to the desired setting. The oven's electrical circuit is set forth in Fig. 8 covering a preferred form of a conventional oven circuit, forming no part of this invention, in which the potential between L1 or L2 is 236 volts, and between either L1 or L2 and neutral is 118 volts. When knob 46 is turned to a "bake" setting, single pole, double throw switch 95 closes so as to energize "bake" contact 96. Also, single pole, single throw switch 97 will be closed by turning to the "bake" setting. As the oven is cold, the double pole thermostat switch 98 will be closed. The bake unit circuit is then L1 through 98, through switch 95, contact 96, through unit 44, and thermostat switch 98, to L2. The broil unit is also energized during baking with a circuit from L2 through 98, through unit 45, and switch 97, to N. We thus have a circuit in which 236 volts is impressed across bake unit 44 and 118 volts is impressed across broil unit 45. The broil coil is operated at the lower voltage indicated only during baking, in order to provide a desired degree of food "browning." As shown and described, during baking, the broil and bake units are under the control of the double pole thermostat switch 98. When the oven reaches the desired pre-determined temperature set by the thermostat knob, the capillary tube 51 will sense this temperature and actuate the thermostat, opening switch 98 and de-energizing the heating units. The thermostat T may be of any conventional type, and has been shown only schematically. As the oven temperature drops, the thermostat contacts will re-close at the appropriate temperature, again completing the circuit to the units, as is well known in the art. The oven units will continue to cycle as described under the control of the thermostat switch throughout the baking operation. During both baking and broiling operations, the oven will be vented through oven vent 40, to vent stack S and then out to the atmosphere through cabinet door vents 8.

Broiling operations are carried out in the oven "down" position as shown in Fig. 1. In this position the oven contacts 55 will be in engagement with energized terminals 31 of runway 28. As spattering from meat cooking will take place during the broiling operation, knob 18 is pulled to lower transparent broiler shield 16 over oven opening 42, in order to retain the spatter within the oven. When oven switch knob 46 and thermostat knob 47 are turned to the "broil" setting, switch 95 will be actuated to engage contact 99 and switch 97 will open. As is well known, the thermostat setting at the "broil" position ordinarily represents a temperature of at least 550° F., whereup the contacts of switch 98 will be in closed circuit position. We then have a complete broil unit circuit from L1, through thermostat switch 98, through switch 95 and contact 99, through broil unit 45, and through 98, to L2. As the unit 45 is across terminals L1 and L2, 236 volts is applied to broil unit 36 during the broiling operation. The counter broiling arrangement described is convenient in that the broiling is done at eye-level; thus the transparent glass shield 16 permits the operation to be closely watched and controlled. Whereas during the baking operation a comparatively restricted circulation of air through the oven is desirable—and in the present invention the relatively small gaps at the front of the oven between gaskets 52 and 53 limit entry of air into the oven during baking—it is desirable to have a substantially greater inflow of air into the oven during broiling. Otherwise, the temperature within the oven may exceed even the high setting of the thermostat, whereupon the thermostat would cycle the broil unit 45. Such cycling is considered undesirable in broiling. Accordingly, shield 16 is proportioned relative to the oven opening to provide adequate protection against spattering, while affording ample flow of air into the oven.

The raisable oven description contained herein applies particularly to a construction for installation against a wall. However, it will be understood that with slight modifications my invention can also be installed over an island counter. For island installations, both the back and the front of the oven could be open. Food may then be loaded or removed from either side of the island. This type of installation would of course require the addition of a back insulation panel to the housing to close the rear of the oven in the "up" position. Also, the electrical power supply means for the oven would be moved from the rear to the side of the oven.

While there has been described what is at present considered to be the preferred embodiment of the invention, it will be understood that various modifications may be made therein, and it is intended to cover in the appended claims all such modifications as fall within the scope of the invention.

I claim:

1. A cooking appliance, comprising wall means forming an open-bottom, box-like housing, a side wall of said housing being thermally insulated, means for mounting said side wall for movement between an open and a closed position relative to said housing, means for supporting said housing in a fixed, elevated position, structure defining an insulated cooking chamber having an enlarged side wall opening facing said housing side wall, means disposed within said housing and co-operating with said cooking chamber structure for guiding said structure for movement into or out of said housing through the open bottom thereof, means including a reversible electric motor for raising or lowering said cooking chamber structure relative to said housing according to the direction of rotation of said motor, an electric reversing circuit for energizing said motor, said circuit including a manually operable reversing switch, a first limit switch in said motor energizing circuit to establish a predetermined baking position for said cooking chamber within said housing with the said thermally insulated side wall providing a closure for said chamber, a second limit switch in said circuit to establish a predetermined broiling position for said cooking chamber externally of said housing, means on said cooking chamber structure for actuating the respective limit switches, electric heating means disposed within said cooking chamber for effecting baking operations therein, electric heating means disposed within said chamber for effecting broiling operations therein, electric circuit means for energizing said baking heating means when said cooking chamber structure has attained its baking position within said housing, electric circuit means for energizing said broiling heating means when said cooking chamber structure has attained its said broiling position, means for providing ventilation of said cooking chamber when said chamber is in its baking position, and means for providing a closure for said chamber when said chamber is in its said broiling position.

2. A cooking appliance according to claim 1 in which said last-named closure-providing means comprises a wall structure carried by said housing for movement therefrom into covering relation with said cooking chamber opening.

3. A cooking appliance according to claim 1 in which said last-named closure-providing means comprises a panel slidably mounted within the lower portion of said insulated housing wall, said panel having means for withdrawing the same from said wall into said covering relation.

4. A cooking appliance, comprising wall means forming an open-bottom, box-like housing, means for supporting said housing in a fixed, elevated position, structure defining an insulated cooking chamber, means disposed within said housing and co-operating with said cooking chamber structure for guiding said structure for movement into or out of said housing through the open-bottom thereof, means including a reversible electric motor for raising or lowering said cooking chamber structure relative to said housing according to the direction of rotation of said motor, an electric reversing circuit for energizing said motor, said circuit including a manually operable reversing switch, a first limit switch in said motor energizing circuit to establish a predetermined limit of movement of said cooking chamber structure into said housing, a second limit switch in said circuit to establish a predetermined limit of movement of said structure out of said housing, means on said cooking chamber structure for actuating the respective limit switches, a plurality of electric heating elements disposed within said cooking chamber for effecting cooking operations therein, electric circuit means for energizing certain of said heating elements only when said cooking chamber structure has attained a first predetermined cooking position within said housing, electric circuit means for energizing other of said heating elements only when said cooking chamber structure has attained a second predetermined cooking position below said housing, and means for providing restricted ventilation of said cooking chamber when said chamber is in its first-named cooking position.

5. A cooking appliance, comprising an open bottomed cabinet arranged for installation above a counter, said cabinet having a vertically movable, insulated cooking oven mounted therein, said oven having an open front providing an access opening, electrical heating means in said oven providing energy for baking and for broiling; means to raise and lower said oven through said open bottom whereby said oven can be disposed for cooking operations in either an "up" above-counter "baking" position substantially enclosed within said cabinet, or lowered through said cabinet bottom opening and disposed in a "down" or "broiling" position substantially below said cabinet; an insulated panel disposed within said cabinet so as substantially completely to close said oven access opening in the "up" position of said oven, whereby the oven is adapted to baking in its "up" position; a broiler shield; and means for mounting said broiler shield relative to said insulated panel, whereby said shield may be manually movable to a position in front of said access opening in the "down" position of said oven whereby the oven is adapted to broiling in its "down" position.

6. The cooking appliance according to claim 5, in which said broiler shield is slidably housed within said insulated panel for withdrawal therefrom to its said position in front of the oven access opening.

References Cited in the file of this patent

UNITED STATES PATENTS

| | | |
|---|---|---|
| 2,180,161 | Miller | Nov. 14, 1939 |
| 2,658,985 | Maxwell | Nov. 10, 1953 |
| 2,812,415 | Markowitz | Nov. 5, 1957 |

FOREIGN PATENTS

| | | |
|---|---|---|
| 790,444 | France | Sept. 9, 1935 |